US005793963A

United States Patent [19]
Tapperson et al.

[11] Patent Number: 5,793,963
[45] Date of Patent: Aug. 11, 1998

[54] APPARATUS FOR PROVIDING NON-REDUNDANT SECONDARY ACCESS TO FIELD DEVICES IN A DISTRIBUTED CONTROL SYSTEM

[75] Inventors: Gary Tapperson; Thomas Andrew Boyd, both of Austin, Tex.

[73] Assignee: Fisher Rosemount Systems, Inc., Austin, Tex.

[21] Appl. No.: 893,126

[22] Filed: Jul. 15, 1997

Related U.S. Application Data

[63] Continuation of Ser. No. 328,324, Oct. 24, 1994, abandoned.

[51] Int. Cl.$^6$ ............................................. G06F 11/30
[52] U.S. Cl. .......................... 395/200.31; 395/200.54; 395/200.47
[58] Field of Search .................. 395/200.31, 200.54, 395/200.47

[56] References Cited

U.S. PATENT DOCUMENTS

| | | | |
|---|---|---|---|
| 4,149,237 | 4/1979 | Freitas | 364/138 |
| 4,152,760 | 5/1979 | Freitai et al. | 364/107 |
| 4,268,822 | 5/1981 | Olsen | 340/533 |
| 4,303,973 | 12/1981 | Williamson, Jr. et al. | 364/103 |
| 4,726,017 | 2/1988 | Krum et al. | 370/85 |
| 4,729,091 | 3/1988 | Freeman et al. | |
| 4,910,658 | 3/1990 | Dudash et al. | 364/138 |
| 4,916,441 | 4/1990 | Gombrich | 340/712 |
| 5,088,021 | 2/1992 | McLauglin et al. | 364/187 |
| 5,099,444 | 3/1992 | Wilson et al. | 364/709.09 |
| 5,131,019 | 7/1992 | Sheffer et al. | 379/39 |
| 5,142,550 | 8/1992 | Tymes | 375/1 |
| 5,150,363 | 9/1992 | Mitchell | 370/112 |
| 5,239,662 | 8/1993 | Danielson et al. | 395/800 |
| 5,374,231 | 12/1994 | Obrist | 483/15 |
| 5,400,246 | 3/1995 | Wilson et al. | 364/146 |
| 5,451,923 | 9/1995 | Seberger et al. | 340/310.06 |
| 5,493,569 | 2/1996 | Buchholz et al. | 370/85.7 |
| 5,495,482 | 2/1996 | White et al. | 370/85.11 |
| 5,495,484 | 2/1996 | Self et al. | 370/110.1 |

FOREIGN PATENT DOCUMENTS

| | | |
|---|---|---|
| 0 491 657 A1 | 6/1992 | European Pat. Off. |
| 216109 | 8/1989 | New Zealand. |
| 227231 | 1/1991 | New Zealand. |
| 239534 | 11/1993 | New Zealand. |

OTHER PUBLICATIONS

D.A. Roberts, "'Olchfa' A Distributed Time–Critical Field-sou", IEE, UK, London, Digest No: 1993/189, Oct./93 pp. 6/1–6/3.

*Primary Examiner*—Mehmet B. Geckil
*Attorney, Agent, or Firm*—Kinney & Lange, P.A.

[57] ABSTRACT

An apparatus for accessing field devices in a distributed control system provides non-redundant secondary access to a plurality of field devices that are controlled by a control room. The field devices are coupled to a Fieldbus control network. In a first embodiment, each field device is provided with a wireless Fieldbus port that is accessible by a wireless handheld unit or wireless terminal. In a second embodiment, each Fieldbus control network is provided with a field module having a wireless Fieldbus port that allows all devices connected to the Fieldbus control network to be accessed by a wireless handheld unit or a wireless terminal. In a third embodiment, an H2-to-H1 Fieldbus bridge (which may service a plurality of H1 control networks) is provided with a wireless Fieldbus port that allows all Fieldbus devices connected to H1 control networks serviced by the H2-to-H1 bridge to be access by a wireless handheld unit of a wireless terminal. In a fourth embodiment, a bridge/converter provides an interface between older analog control room components and newer Fieldbus field devices. In one configuration, the bridge/converter includes a hard-wired Fieldbus port connected to a terminal, which may be in the control room. In another configuration, the bridge/converter includes a wireless Fieldbus port that allows a wireless handheld unit or a wireless terminal to access the Fieldbus devices serviced by the bridge/converter. The present invention allows a maintenance person to access Fieldbus field devices while servicing a device in the field, and allows secondary functions of field devices (which vary by manufacturer) to be accessed from a single remote unit.

27 Claims, 3 Drawing Sheets

APPARATUS FOR PROVIDING NON-REDUNDANT SECONDARY ACCESS TO FIELD DEVICES IN A DISTRIBUTED CONTROL SYSTEM

This is a continuation of application Ser. No. 08/328,324, filed Oct. 24, 1994 now abandoned.

BACKGROUND OF THE INVENTION

This invention relates to accessing field devices in a distributed control system. Specifically, this invention relates to accessing such field devices remotely using wireless transceivers, and accessing functions of the field devices that may not be accessible by the controller of the distributed control system.

In a typical industrial plant, a distributed control system (DCS) is used to control many of the industrial processes performed at the plant. Typically, the plant has a centralized control room having a computer system with user I/O, disc I/O, and other peripherals as are known in the computing art. Coupled to the computing system is a controller and a process I/O subsystem.

The process I/O subsystem includes a plurality of I/O ports which are connected to various field devices throughout the plant. Field devices known in the control art include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. As used herein, the term "field device" encompasses these devices, as well as any other device that performs a function in a distributed control system and is known in the control art.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

In contrast, traditional discrete field devices transmit or respond to a binary signal. Typically, discrete field devices operate with a 24 volt signal (either AC or DC), a 110 or 240 volt AC signal, or a 5 volt DC signal. Of course, a discrete device may be designed to operate in accordance with any electrical specification required by a particular control environment. A discrete input field device is simply a switch which either makes or breaks the connection to the control room, while a discrete output field device will take an action based on the presence or absence of a signal from the control room.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

HART is an industry standard nonproprietary system. However, it is relatively slow. Other companies in the industry have developed proprietary digital transmission schemes which are faster, but these schemes are generally not used by or available to competitors.

More recently, a newer control protocol has been defined by the Instrument Society of America (ISA). The new protocol is generally referred to as Fieldbus, and is specifically referred to as SP50, which is as acronym for Standards and Practice Subcommittee 50. The Fieldbus protocol defines two subprotocols. An H1 Fieldbus network transmits data at a rate up to 31.25 kilobits per second and provides power to field devices coupled to the network. An H2 Fieldbus network transmits data at a rate up to 2.5 megabits per second, does not provide power to field devices connected to the network, and is provided with redundant transmission media. Fieldbus is a nonproprietary open standard and is attracting attention in the industry.

As additional protocols and architecture gain popularity in the industry, the industry will face greater and greater challenges melding these technologies together into a single distributed control system. For example, newer devices will be coupled to an existing distributed control system. In these situations, the signals coming from the control room may expect traditional analog or hybrid technologies, but the field devices may be coupled to an H1 or H2 Fieldbus network. Conversely, the control room of the industrial plant may be renovated, with the inputs and outputs to the control room comprising a modern H1 or H2 field bus, and the individual signals running to some older analog and hybrid field devices, and newer Fieldbus based field devices.

In addition to the challenge of integrating various technologies into a single distributed control system, newer field devices will have maintenance modes and enhanced functions that are not accessible via an older control system. In addition, even when all components of a distributed control system adhere to the same standard (such as the Fieldbus standard), one manufacturer's control room equipment may not be able to access the secondary functions or secondary information provided by another manufacturer's field devices.

SUMMARY OF THE INVENTION

The present invention provides an apparatus for providing non-redundant secondary access to field devices in a distributed control system having a control room for providing primary access to the field devices, thereby enabling secondary access of all information and functions available in field devices.

In a first embodiment of the invention, each field device is provided with a wireless port and can be accessed by a wireless handheld unit or a wireless terminal. In one configuration of this embodiment, the wireless port is powered by the control network to which the field device is connected.

In a second embodiment of the invention, a field module having a wireless port is connected to an existing control network. The field module provides access from a wireless handheld unit or a wireless terminal to all field devices connected to the control network. In one configuration of this embodiment, the field module is powered by the control network to which it is connected.

In a third embodiment of the invention, the distributed control system is provided with a bridge that connects a distribution network in the distributed control system to one or more control networks, wherein the control networks are coupled to field devices. The bridge also includes a wireless port that provides access from a wireless handheld unit or a wireless terminal to all field devices connected to the control networks.

In a fourth embodiment of the present invention, a bridge/converter is connected to two-wire twisted pair analog wires coming from an older control room designed to control analog field devices, and couples the older control room to newer network-based field devices. In one configuration of this embodiment, the bridge/converter includes a hard-wired port that is coupled to a terminal. The terminal, which may be placed in the control room, provides the operators of the control system with access to all functions and secondary information of the newer network-based field devices that are not accessible by the older analog components of the control room. In another configuration of this embodiment (which may compliment the first configuration), the bridge/converter is provided with a wireless port that allows the network-based devices to be accessed by a wireless terminal or a wireless handheld unit.

DETAILED DESCRIPTION OF THE PREFERRED EMBODIMENTS

Figure 1:
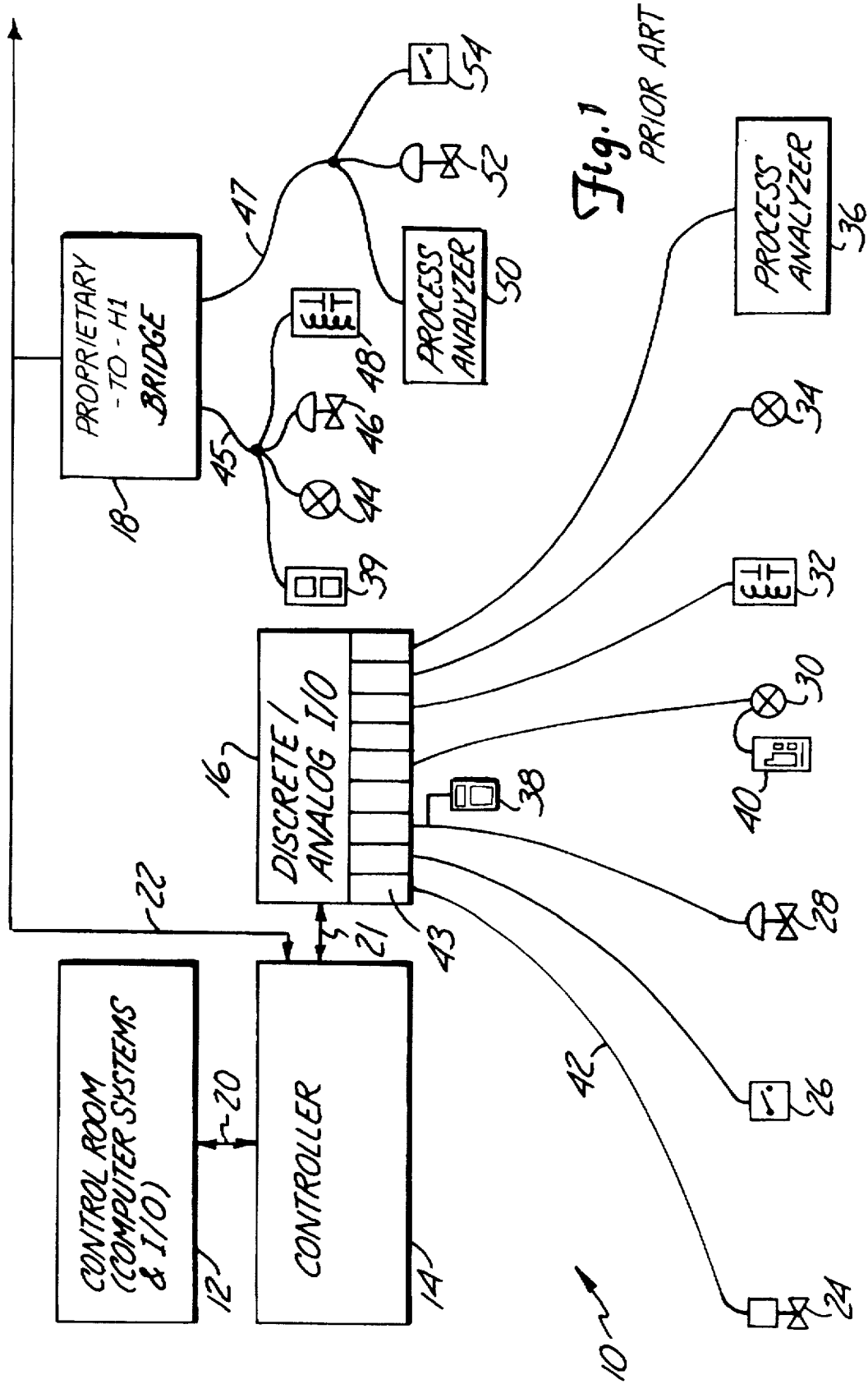
FIG. 1 is a diagram of a prior art distributed control system.

FIG. 1 is a block diagram of a prior art distributed control system (DCS) 10. DCS 10 is comprised of control room 12, controller 14, discrete/analog I/O unit 16, H2-to-H1 bridge 18, and a variety of field devices represented by solenoid 24, switches 26 and 54, valve positioners 28, 46, and 52, transmitters 30, 34, and 44, process analyzers 36 and 50. These devices represent any type of field device known in the control art. Also shown in FIG. 1 are handheld units 38 and 39, which are capable of accessing information in a hybrid or Fieldbus-based field device via a physical wire connection, and a local operator/user station 40, which is capable of issuing and receiving control room-type commands to and from the field device to which it is connected via a physical wire connection.

Control room 12 includes computers, user I/O, various forms of data storage devices, and other computing devices known in the art. Control room 12 is coupled to controller 14 via bus 20, which is typically a proprietary digital communications network or an open digital communication network employing a proprietary protocol. Controller 14 receives various commands from control room 12 and provides data to control room 12.

As depicted in FIG. 1, DCS 10 is a hybrid system comprising two different types of field devices. Devices 24–36 are traditional analog, discrete, and hybrid analog/digital devices, wherein the primary control function of the device is realized by modulating a current. These field devices are coupled to discrete/analog I/O unit 16, with each device connected to an individual channel of unit 16 by a single pair of wires (and possibly two additional power wires in the case of a traditional four-wire field device). For example, solenoid 24 is coupled via two-wire twisted pair 42 to channel 43 of unit 16.

For a traditional analog or discrete field device, the only communication with the device occurs by modulating or switching the current running through the two-wire twisted pair, with the magnitude of the current representing a measured process variable (as in the case of the transmitter), or an action requested by controller 14 (as in the case of a valve positioner or solenoid). Traditional analog devices have a frequency response limited to approximately 10 Hz and receive power from the two-wire twisted pair.

Hybrid analog/digital devices operate in a manner similar to traditional analog devices, but also allow digital communication of secondary information by superimposing a digital carrier signal on the modulated current carried by the two-wire twisted pair. One such hybrid analog/digital system is known in the control art as Highway Addressable Remote Transducer (HART) and transmits data in a manner similar to a conventional computer modem adhering to the Bell 202 specification. Generally, the primary function of these devices is still realized by modulating the current through the loop, while other types of secondary information, such as diagnostic data, operating temperature, identification codes, error codes, and secondary variables, are transmitted digitally. In such a system, digital communication is relatively slow and is limited to approximately 300 baud. When a maintenance person desires to test an analog device, the maintenance person must make a physical connection to the device itself, such as local operator/user station 40 connected to transmitter 30, or to the two-wire twisted pair leading to the device, such as handheld unit 38 connected to the two-wire twisted pair leading to valve positioner 28.

In contrast, devices 44-54 are modern network-based digital field devices, wherein all information is digitally transmitted to and from each device. While many control system manufacturers have developed proprietary digital systems, the Standards and Practices Subcommittee 50 of the Instrument Society of America has developed and specified an architecture known in the art as Fieldbus. The Fieldbus specification includes two types of networks, a lower speed network referred to as H1 and a higher speed network referred to as H2. Both networks can support multiple connections to a single network bus, in contrast to traditional analog connections, which only support one device per two-wire twisted pair. While the present invention is described herein with reference to a Fieldbus network-based control system, in other embodiments the present invention may be employed in any distributed control system having network-based field devices.

A Fieldbus H2 network can transmit data at a rate up to 2.5 megabits per second. In addition, an H2 network include two sets of physical wire media: a primary wire media and a secondary, or redundant, wire media. Should the primary wire media fail, the secondary wire media is automatically used by the DCS. Because of the high capacity and redundancy of H2 Fieldbus networks, H2 Fieldbus networks are beginning to be used as a distribution network that connect the controller to various distribution units in the DCS. However, traditional distribution networks are proprietary networks using either parallel or serial communication.

In FIG. 1, H2 distribution network 22 couples controller 14 to H2-to-H1 bridge 18, and proprietary bus 21 couples controller 14 to discrete/analog I/O unit 16. In other configurations known in the art, unit 16 and bridge 18 may be coupled to a common distribution network. As previously discussed, discrete/analog I/O unit 16 includes discrete channels, with each channel coupled to a single device.

H2-to-H1 bridge links the data carried by proprietary distribution network 22 to H1 Fieldbus control networks 45 and 47. H1 Fieldbus control network 45 is coupled to transmitters 44, valve positioner 46, and relay 48, and H1 Fieldbus 47 is coupled to process analyzer 50, valve positioner 52, and solenoid 54. While an H1 Fieldbus network is not redundant, and has a lower data transmission rate of approximately 31.25 kilobits per second, it is capable of providing power to the devices to which it is coupled, while an H2 Fieldbus network does not. For the above reasons, the H1 Fieldbus network is ideal for providing final connections to individual field devices, while the H2 Fieldbus network is ideal for distributing control signals throughout the physical plant in which the DCS is installed.

More recently, field devices have been provided with microprocessors and additional functionality. Such "smart" field devices are capable of monitoring a plurality of process variables, performing a variety of control functions, performing comprehensive diagnostics, and providing a wide array of various types of status information. The Fieldbus specification specifies a variety of primary functions that may be supported by various Fieldbus field devices. In addition, many manufacturers have provided secondary functions beyond those specified in the Fieldbus specification. While Fieldbus field devices manufactured by different manufacturers are compatible to the extent that only Fieldbus specified functions are accessed, they are not compatible with respect to the secondary functions. For example, a Fieldbus controller manufactured by company A will generally not be able to access the secondary functions provided by a Fieldbus valve positioner manufactured by company B. Therefore, an industrial plant using a variety of Fieldbus components provided by different manufacturers will not be able to derive the benefit of all the functions provided by the various components.

The problem is worse in older distributed control systems that were designed to use traditional analog/discrete and hybrid devices. Often a company will wish to preserve an investment in an existing installation, and will retrofit the installation with newer Fieldbus field devices. In such an installation, the control room will not even be able to access the standardized Fieldbus functions provided by the various devices. Accordingly, a need exists to access the secondary functions provided by various manufacturers, as well as standardized Fieldbus functions when a Fieldbus based device is connected to an older distributed control system.

Figure 2:
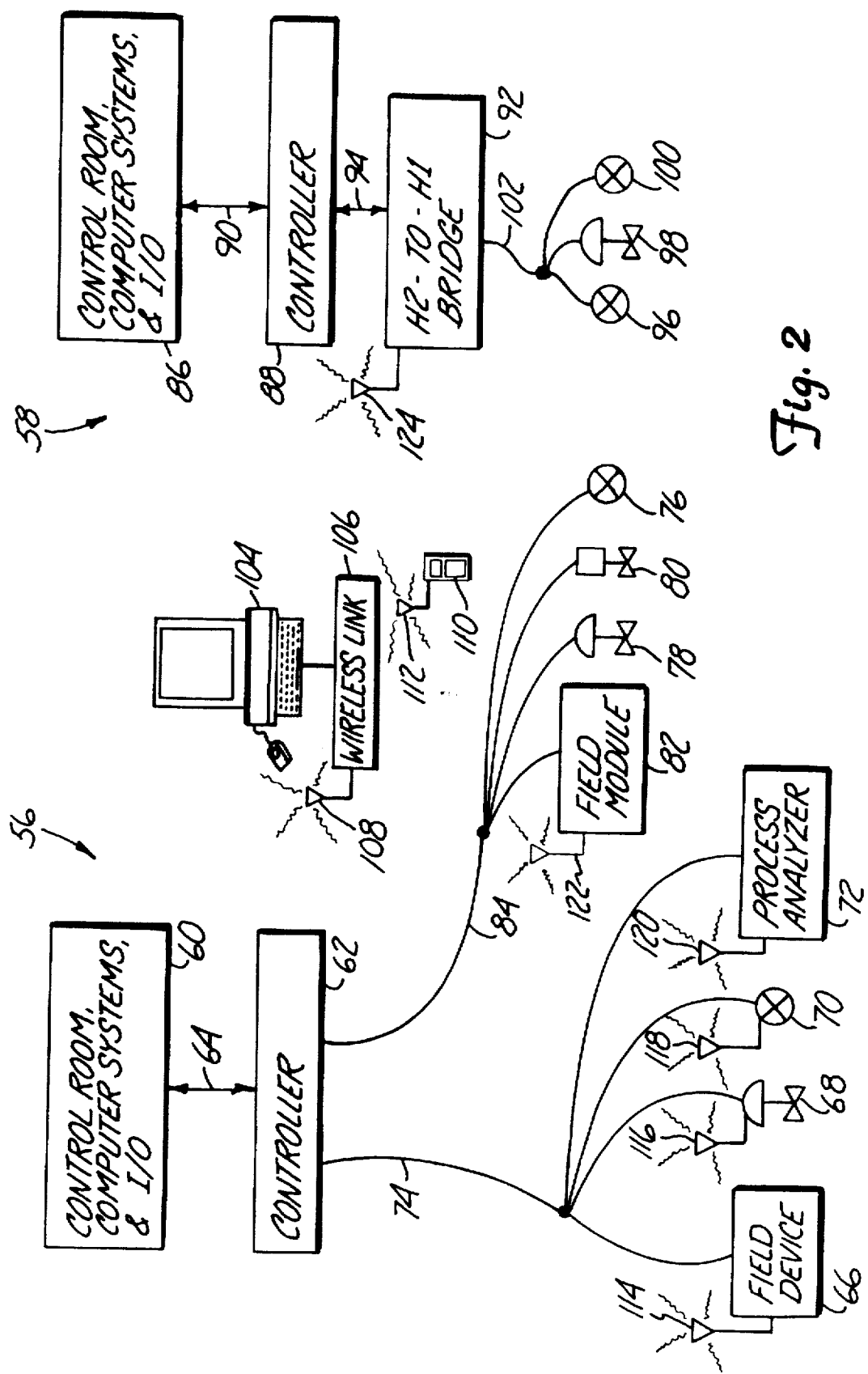
FIG. 2 is a diagram of industrial plant having two distributed control systems and shows three embodiments of the present invention.

FIG. 2 is a diagram of an industrial plant having two distributed control systems. DCS 56 is comprised of control room 60, controller 62, bus 64, field device 66, valve positioner 68, transmitter 70, process analyzer 72, H1 Fieldbus control network 74, transmitter 76, valve positioner 78, solenoid 80, field module 82, and H1 Fieldbus control network 84. DCS 58 is comprised of control room 86, controller 88, bus 90, H2 Fieldbus distribution network 94, H2-to-H1 bridge 92, transmitters 96 and 100, valve positioner 98, and H1 Fieldbus control network 102. Buses 64 and 90 are normally proprietary digital communication networks, or open communication networks employing a proprietary protocol. Also shown in FIG. 2 is terminal 104 which may be in or separated from the control room and handheld control unit 110. Terminal 104 is coupled to wireless link (module 106, which in turn is connected to wireless transceiver 108. Handheld control unit 110 includes wireless transceiver 112.

Two embodiments of the present invention are illustrated in DCS 56. The first embodiment is illustrated by those field devices coupled to H1 Fieldbus control network 74. Each field device on control network 74 includes a wireless transceiver. Field device 66 represents any generic field device coupled to control network 74 and includes wireless transceiver 114. Valve positioner 68 includes wireless transceiver 116, transmitter 70 includes wireless transceiver 118, and process analyzer 72 includes wireless transceiver 120. Each wireless transceiver implements a wireless Fieldbus connection with terminal 104 and handheld unit 110, thereby allowing access to secondary functions of each field device not accessible by control room 60, as well as providing a maintenance person with convenient access to each field device without having to communicate with the control room and independent of the distributed control system.

The wireless Fieldbus connections described herein are implemented by secondary wireless network ports that are used in addition to primary network ports that are hardwired to a control room. Accordingly, a network-based field device may alternately be accessed via either the hardwired connection to the control room or the wireless Fieldbus connection. In contrast, many prior art network-based field devices are provided with a redundant hardwired network connection that is used as a backup if the first connection fails. However, the field device is generally not alternately accessed by either the first or redundant connections, except for testing the redundant connection. In addition, typically the redundant connection is also routed to the control room.

Another novel feature of the present invention is that the wireless Fieldbus port attached to each field device is powered by the hardwired H1 Fieldbus port attached to each device. Therefore, a customer having Fieldbus control equipment from one manufacturer can connect field devices having a wireless Fieldbus port (in accordance with the present invention) to an existing H1 Fieldbus control network, and can access all the functions of the added field devices using a handheld unit having a wireless Fieldbus link, or a terminal having a wireless Fieldbus link. Since the wireless Fieldbus link of the field devices is powered by the existing H1 Fieldbus control network, no additional wiring is required.

The wireless links disclosed herein represent any wireless communication method known in the art, including, but not limited to, radio, infrared, visible light, and ultrasonic forms of wireless communication.

A second embodiment of the present invention is illustrated by the devices connected to H1 Fieldbus control network 84. Transmitter 76, valve positioner 78, and solenoid 80 are each coupled to control network 84. Also coupled to control network 84 is field module 82, which includes a wireless transceiver 122 powered by H1 Fieldbus control network 84. Field module 82, in essence, forms a wireless bridge between control network 84 and handheld unit 110 or terminal 104, and allows unit 110 or terminal 104 to access each device coupled to H1 Fieldbus control network 84. Accordingly, field module 82 is ideally suited for use in an existing environment having a variety of H1 Fieldbus devices from different manufacturers. Handheld unit 110 and terminal 104 can easily be programmed to access the functions of each device on the control network to which field module 82 is connected.

A third embodiment of the present invention is illustrated by DCS 58. In DCS 58, controller 88 is coupled to H2-to-H1 bridge by H2 Fieldbus distribution network 94. H2-to-H1 bridge links H2 Fieldbus distribution network 94 to H1 Fieldbus control network 102. H2-to-H1 bridge also includes a second Fieldbus port connected to wireless transceiver 124, and communicates with a remote device such as handheld unit 110 or terminal 104. Accordingly, the remote wireless field device can access all field devices serviced by the H2-to-H1 bridge, such as transmitters 96 and 100 and valve positioner 98. In other configurations, it is common for an H2-to-H1 bridge to service a plurality of H1 Fieldbus control networks, in which case all field devices connected to all control networks serviced by the H2-to-H1 bridge can be accessed remotely.

Many industrial plants have a plurality of distributed control systems. By using wireless Fieldbus networks, a maintenance person can walk from DCS to DCS with a single handheld control unit and access field devices coupled to each DCS. Since the handheld control unit can be programmed to access each field device, the maintenance person can access all the functions of devices supplied by different manufacturers.

Figure 3:
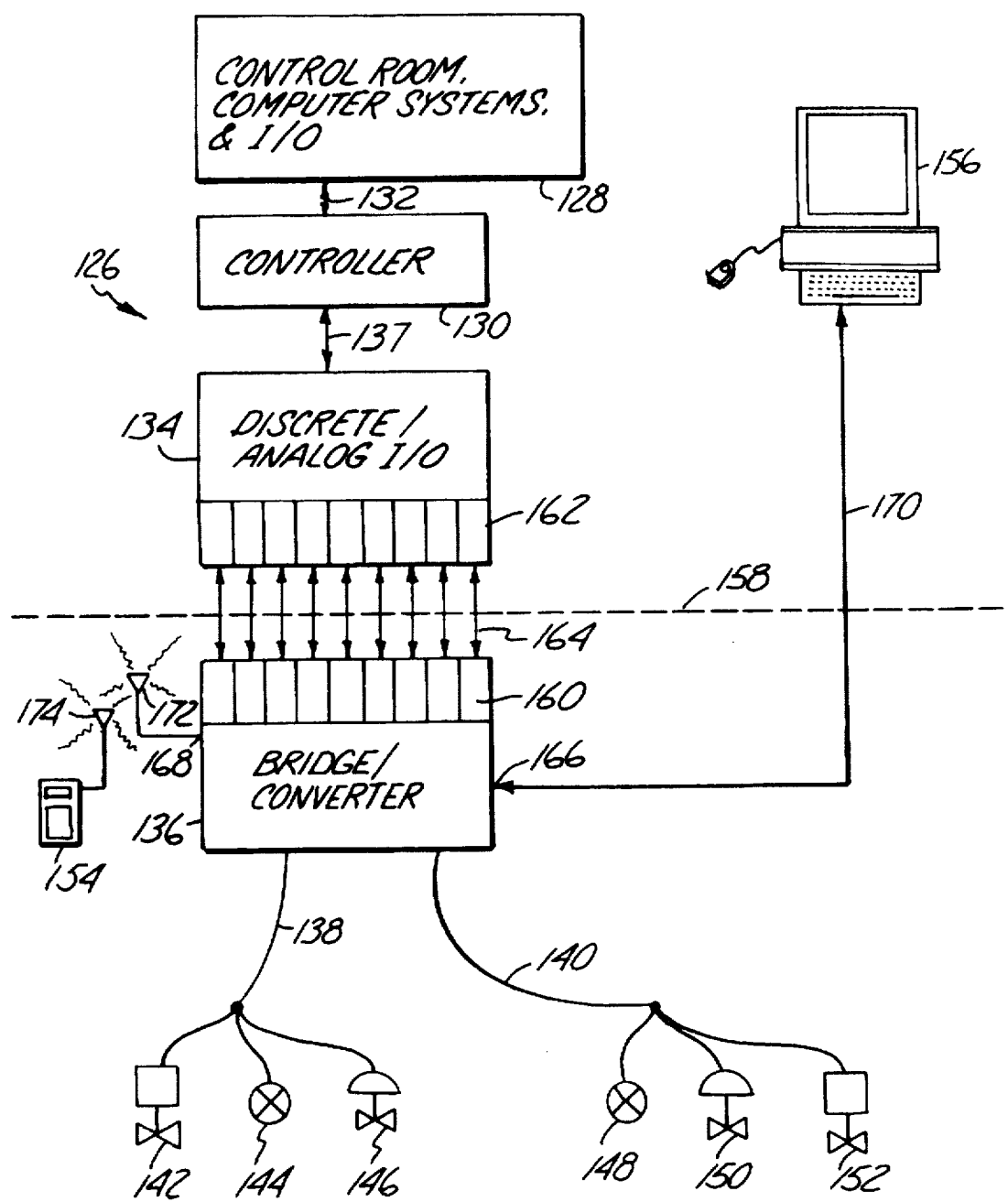
FIG. 3 is a diagram of an industrial plant having an older analog distributed control system that has been retrofitted with newer network-based field devices and shows an embodiment of the present invention.

FIG. 3 shows an embodiment of the present invention adapted for use in older distributed control systems that have been retrofitted with newer Fieldbus field devices. DCS 126 includes control room 128, controller 130, bus 132, discrete/analog I/O unit 134, bridge/converter 136, bus 137, H1 Fieldbus control networks 138 and 140, solenoids 142 and 152, transmitters 144 and 148, valve positioner 146 and 150, handheld unit 154, and terminal 156.

DCS 126 represents an older distributed control system designed for use with traditional discrete analog/discrete and hybrid field devices. With the exception of terminal 156, everything above dotted line 158 represents components that are part of an older existing installation. Everything below dotted line 158 (and terminal 156) represent newer Fieldbus components that have been added to the installation.

Bridge/converter 136 interfaces the older portion of DCS 126 (above dotted line 158) to the Fieldbus devices. Bridge/converter 136 includes a plurality of process I/O channels (such as channel 160) that are coupled to corresponding process I/O channels of discrete/analog I/O unit 134 (such as channel 162) by two-wire twisted pairs (such as two-wire twisted pair 164). Bridge/converter 136 converts the analog, discrete, and/or hybrid information provided by discrete/analog I/O unit 134 into digital information that is transmitted to devices on H1 Fieldbus networks 138 and 140, and converts the digital information received from devices on networks 138 and 140 into analog, discrete, and/or hybrid information required by discrete/analog I/O unit 134.

From the viewpoint of control room 128, the Fieldbus field devices appear as traditional analog/discrete and hybrid field devices. Accordingly, control room 128 cannot access any of the secondary functions provided by the Fieldbus field devices. To access these functions, bridge/converter 136 is provided with an active hard-wired Fieldbus port 166 and wireless Fieldbus port 168.

Hard-wired Fieldbus port 166 is connected to Fieldbus network 170, which in turn is connected to terminal 156. In one embodiment, terminal 156 is located within control room 128, and provides operators within the control room with access to all the functions that are provided by the Fieldbus field devices, and are not accessible through existing control room components. Port 166 is not a redundant port, rather it is a secondary port that provides the control room with access to all the functions provided by the Fieldbus based devices. Accordingly, a control room operator may alternately access a Fieldbus based device via discrete/analog I/O unit 134, or terminal 156. In contrast, a redundant port is used as a backup if the first port fails. In the configuration shown in FIG. 3, a redundant port would not be coupled to the control room.

Fieldbus port 168 is connected to wireless transceiver 172, thereby forming a wireless Fieldbus network similar to the wireless Fieldbus networks shown in FIG. 2. Handheld unit 154 has wireless transceiver 174, and communicates with Fieldbus devices 142–152 via wireless transceiver 172, which is connected to wireless port 168 of bridge/converter 136. In addition to handheld unit 154, a terminal having a wireless link (such as terminal 104 and wireless link 106 in FIG. 2) may be used to communicate with the field devices coupled to bridge/converter 136.

The present invention provides an apparatus for providing secondary access to field devices in a distributed control system having a control room for providing primary access to the field devices. In a modern distributed control system having Fieldbus devices coupled to a Fieldbus control room, the present invention provides a wireless link to a remote unit, such as a handheld device or a terminal having a wireless link, thereby allowing a maintenance person to access each Fieldbus device in the field via the remote unit. Since a Fieldbus control room from one manufacturer may not be able to access secondary functions of a Fieldbus device from another manufacturer, the handheld unit can also provide a convenient way to access secondary functions provided by various manufacturers from a single, easily programmed handheld unit or remote terminal.

In one embodiment, each Fieldbus-based device is provided with its own secondary wireless H1 or H2 Fieldbus port that is powered by the H1 Fieldbus control network.

This embodiment provides maximum flexibility because no modification of the distributed control system is required, and is ideally suited for new devices that are to be added to an existing Fieldbus installation. As soon as the H1 Fieldbus device is connected to the existing H1 Fieldbus control network, the device can be accessed via the wireless handheld unit or the wireless terminal.

In another embodiment of the invention, a field module is connected to an existing Fieldbus control network. The field module has a wireless H1 or H2 Fieldbus port that is powered by the H1 Fieldbus control network, and provides access from the wireless handheld unit or the wireless terminal to all Fieldbus devices connected to the control network. This embodiment is ideally suited for distributed control systems that already have Fieldbus devices. In yet another embodiment of the present invention, the distributed control system is provided with an H2-to-H1 bridge having one or more H1 control networks coupled to Fieldbus devices, a hard-wired H2 port coupled to a controller, and a wireless H2 or H1 Fieldbus port. The wireless Fieldbus port allows a wireless handheld unit or a wireless terminal to access all Fieldbus devices on all H1 control networks serviced by the H2-to-H1 bridge.

In a fourth embodiment of the present invention, a bridge/converter is connected to the two-wire twisted pair analog/discrete and hybrid wires coming from an older control room, and couples the older control room to newer Fieldbus devices. In this embodiment, the bridge/converter provides an H1 or H2 Fieldbus port to allow access to functions of the Fieldbus devices not accessible from the control room. In one configuration, a terminal is connected to the bridge/converter via a hard-wire Fieldbus network. The terminal, which may be placed in the control room, provides the operators of the control system with access to all functions of the Fieldbus-based devices. In another configuration (which may compliment the first configuration), the bridge/converter is provided with a wireless H1 or H2 Fieldbus port that allows the Fieldbus field devices to be accessed by a wireless terminal or a wireless handheld unit.

Although the present invention has been described with reference to preferred embodiments, workers skilled in the art will recognize that changes may be made in form and detail without departing from the spirit and scope of the invention.

What is claimed is:

1. A distributed control system for controlling material flow within an industrial process, comprising:
   a plurality of industrial process control field devices for sensing or altering material flow within the industrial process, each industrial process control field device having first and second control functions;
   first control means connected via a first respective signal path to each industrial process control field device to communicate first signals between the first control means and each industrial process control field device, for controlling the first control function and not the second control function; and
   second control means connected via a second respective signal path to each industrial process control field device to communicate second signals between the second control means and each industrial process control device for controlling the second control function of each industrial process control field device, thereby providing non-redundant control of the second control function of each industrial process control field device.

2. The distributed control system of claim 1 wherein the second control means comprises:
   a wireless signal processor connected to each industrial process control field device , for providing non-redundant control of the second control function via wireless second signals communicated through the wireless signal processor to each industrial process control field device.

3. The distributed control system of claim 2 wherein the first control means sup plies operating power via the first signal path to each industrial process control field device, and further including:
   means for supplying operating power from the first signal path to the wireless signal processor.

4. The system of claim 3 wherein the wireless signal processor is part of a field module connected to the industrial process control field device, and the means for supplying operating power includes a connection of the wireless signal processor to the first signal path.

5. The system of claim 3 including a bridge in the first signal path, wherein the means for supplying operating power includes a connection of the wireless signal processor to the bridge.

6. The system of claim 3 wherein the means for supplying operating power includes a connection of the wireless signal processor to the industrial process control field device.

7. The distributed control system of claim 1 further comprising:
   a first wireless transceiver coupled to each industrial process control field device; and
   wherein the second control means includes a second wireless transceiver, for remotely controlling the second control function of each industrial process control field device via wireless second signals communicated between the first and second wireless transceivers.

8. The system of claim 7 wherein the second wireless transceiver is programmable to communicate with each industrial process control field device.

9. The system of claim 7 wherein the first and second transceivers communicate via at least one of radio, infrared, visible light, and ultrasonic communications.

10. The distributed control system of claim 1 wherein the second control means comprises:
    a remote terminal connected via the second signal path to each industrial process control field device to communicate the second signals to each industrial process control field device to exclusively control the second control function of each field device via second signals substantially confined to the second signal path.

11. The system of claim 1 wherein the second control function of each industrial process control field device outputs status signals for the respective industrial process control field device, the status signals including at least one of diagnostic signals, identity signals, and calibration signals.

12. The system of claim 1 wherein each industrial process control field device includes a member of the group consisting of a valve positioner, a flow transmitter, a temperature sensor, and a pressure sensor.

13. A distributed control system for controlling material flow within an industrial process, comprising:
    a plurality of industrial process control field devices for sensing or altering material flow within the industrial process, each industrial process control field device having first and second control functions, the first control function for altering or sensing material flow and the second control function for generating a status signal for the respective industrial process control field device, central control means coupled via a respective signal path to each industrial process control field device, for controlling the first control function and not the second control function of each industrial process control field device via respective first signals substantially confined to the respective signal path;

a first wireless transceiver for requesting and receiving the status signal for each industrial process control field device; and second wireless transceiver that connects to each industrial process control field device, for accessing the second control function of each industrial process control field device in response to requests from the first wireless transceiver and for sending the status signal of each industrial process control field device to the first wireless transceiver, thereby providing non-redundant access to the status signal of each industrial process control field device.

14. The distributed control system of claim 13 wherein the central control means supplies operating power via the respective signal path to each industrial process control field device, and further including:

means for supplying power from one respective signal path to the second wireless transceiver.

15. The system of claim 14:

wherein the second wireless transceiver is part of a field module that connects to each of the industrial process control field devices; and wherein the means for supplying operating power includes a connection of the second wireless transceiver to the one respective signal path.

16. The system of claim 14 including a bridge in the one respective signal path, wherein the means for supplying operating power includes a connection of the second wireless transceiver to the bridge.

17. The system of claim 14 wherein the means for supplying operating power includes a connection of the second wireless transceiver to one of the industrial process control field devices.

18. The system of claim 13 wherein the status signal includes at least one diagnostic, identity, or calibration signal for the respective industrial process control field device.

19. The system of claim 13 wherein at least one of the industrial process control field devices includes a member of the group consisting of a valve positioner, a flow transmitter, a pressure sensor, and temperature sensor.

20. The system of claim 13 where in the first and second wireless transceivers communicate via at least one of radio, infrared, visible light, and ultrasonic communications.

21. The system of claim 13 wherein the first wireless transceiver is programmable to communicate with each industrial process control device.

22. In a distributed control system including a first industrial progress control field device having first status means for generating first status signals, and a second industrial process control field device having second status means for generating second status signals, a controller connected via respective signal paths to the first and second industrial process control field devices to send respective control signals to the first and second industrial process control field devices but not to receive the first and second status signals, the respective control signals being substantially confined to the respective signal paths, the improvement comprising:

a first wireless transceiver for receiving the first and second status signals;

a second wireless transceiver for connection to the first and second status means of the first and second industrial process control field devices, to send the first and second status signals to the first wireless transceiver, thereby providing non-redundant wireless access to the status signals of the first and second industrial process control field devices.

23. The system of claim 22 wherein the first and second status signals include at least one of diagnostic, identity, and calibration data.

24. The distributed control system of claim 22 wherein the controller supplies operating power via the respective signal path to each industrial process control field device, and further including:

means for supplying power from one respective signal path to the second wireless transceiver.

25. The system of claim 22:

wherein the second wireless transceiver is part of a field module that connects to each of the industrial process control field devices; and wherein the means for supplying operating power includes a connection of the second wireless transceiver to the one respective signal path.

26. The system of claim 22 including a bridge in the one respective signal path, wherein the means for supplying operating power includes a connection of the second wireless transceiver to the bridge.

27. The system of claim 22 wherein the means for supplying operating power includes a connection of the second wireless transceiver to one of the industrial process control field devices.

* * * * *